US011790900B2

(12) United States Patent
Shaked et al.

(10) Patent No.: US 11,790,900 B2
(45) Date of Patent: Oct. 17, 2023

(54) SYSTEM AND METHOD FOR AUDIO-VISUAL MULTI-SPEAKER SPEECH SEPARATION WITH LOCATION-BASED SELECTION

(71) Applicant: Hi Auto LTD., Tel Aviv (IL)

(72) Inventors: Yaniv Shaked, Binyamina (IL); Yoav Ramon, Tel Aviv (IL); Eyal Shapira, Kiryat Ono (IL); Roy Baharav, Tel Aviv (IL)

(73) Assignee: HI AUTO LTD., Tel Aviv (IL)

( * ) Notice: Subject to any disclaimer, the term of this patent is extended or adjusted under 35 U.S.C. 154(b) by 0 days.

(21) Appl. No.: 16/841,142

(22) Filed: Apr. 6, 2020

(65) Prior Publication Data

US 2021/0312915 A1 Oct. 7, 2021

(51) Int. Cl.
*G10L 15/20* (2006.01)
*G10L 21/0272* (2013.01)
*G10L 17/18* (2013.01)

(52) U.S. Cl.
CPC .............. *G10L 15/20* (2013.01); *G10L 17/18* (2013.01); *G10L 21/0272* (2013.01)

(58) Field of Classification Search
CPC ..... G10L 15/20; G10L 21/0272; G10L 17/18; G10L 15/00; G10L 17/00; G10L 2021/02082; G10L 2021/02166; H04N 7/14; G06V 40/161; G06V 40/20
See application file for complete search history.

(56) References Cited

U.S. PATENT DOCUMENTS

| 5,586,215 A | * | 12/1996 | Stork | ...................... G10L 15/16 |
| | | | | 704/243 |
| 7,243,060 B2 | | 7/2007 | Atlas et al. | |
| 8,112,272 B2 | | 2/2012 | Nagahama et al. | |

(Continued)

FOREIGN PATENT DOCUMENTS

| CN | 110246512 A | 9/2019 |
| CN | 110709924 A | 1/2020 |

(Continued)

OTHER PUBLICATIONS

Adel, et al., "Beamforming Techniques for Multichannel Audio Signal Separation," 2012, JDCTA: International Journal of Digital Content Technology and its Applications, vol. 6, No. 20, Tunis, Tunisia, pp. 659-667.
Afouras, et al., "The Conversation: Deep Audio-Visual Speech Enhancement," Interspeech Conference, University of Oxford, UK, pp. 3244-3248.

(Continued)

*Primary Examiner* — Michael N Opsasnick
(74) *Attorney, Agent, or Firm* — M&B IP Analysts, LLC

(57) ABSTRACT

A system for audio-visual multi-speaker speech separation. The system includes a processing circuitry and a memory containing instructions that, when executed by the processing circuitry, configure the system to: receive audio signals captured by at least one microphone; receive video signals captured by at least one camera; and apply audio-visual separation on the received audio signals and video signals to provide isolation of sounds from individual sources, wherein the audio-visual separation is based, in part, on angle positions of at least one speaker relative to the at least one camera. The system provides for reliable speech processing and separation in noisy environments and environments with multiple users.

29 Claims, 12 Drawing Sheets

(56) References Cited

U.S. PATENT DOCUMENTS

| | | | |
|---|---|---|---|
| 9,633,270 B1* | 4/2017 | Tangeland | G10L 17/00 |
| 2003/0081504 A1 | 5/2003 | McCaskill | |
| 2003/0083872 A1* | 5/2003 | Kikinis | G10L 15/24 |
| | | | 704/243 |
| 2010/0277579 A1 | 11/2010 | Cho et al. | |
| 2016/0064000 A1* | 3/2016 | Mizumoto | G06V 10/507 |
| | | | 704/233 |
| 2017/0134850 A1* | 5/2017 | Graham | H04R 3/005 |
| 2017/0195128 A1* | 7/2017 | Ng | G06F 3/0484 |
| 2018/0070053 A1* | 3/2018 | Feng | H04R 1/406 |
| 2018/0240471 A1* | 8/2018 | Markovich Golan | |
| | | | G10L 21/0232 |
| 2018/0286065 A1 | 10/2018 | Knorr et al. | |
| 2018/0293988 A1* | 10/2018 | Huang | G10L 17/20 |
| 2018/0365657 A1* | 12/2018 | Kitada | G06Q 10/1095 |
| 2019/0005976 A1 | 1/2019 | Peleg et al. | |
| 2019/0066713 A1 | 2/2019 | Mesgarani et al. | |
| 2019/0318757 A1 | 10/2019 | Chen et al. | |

FOREIGN PATENT DOCUMENTS

| | | |
|---|---|---|
| EP | 3392882 A1 | 10/2018 |
| KR | 20190106943 A | 9/2019 |
| WO | 2019104229 A1 | 5/2019 |

OTHER PUBLICATIONS

Chung, et al., "Out of Time: Automated Lip Sync in the Wild," Computer Vision—ACCV 2016 Workshops: ACCV 2016 International Workshops, University of Oxford, Nov. 20-24, 2016, Revised Selected Papers, Part II, pp. 251-263.

Ephrat, et al., "Looking to Listen at the Cocktail Party: A Speaker-Independent Audio-Visual Model for Speech Separation," ACM Trans. Graph. vol. 37, No. 4: 112:1-112:11, 2018.

Eyben, et al., "Real-life Voice Activity Detection with LSTM Recurrent Neural Networks and an Application to Hollywood Movies," IEEE International Conference on Acoustics, Speech and Signal Processing, Technical University, Munich, Gemnany, pp. 1-5, 2013.

Kavalerov, et al., "Universal Sound Separation", IEEE Workshop on Applications of Signal Processing to Audio and Acoustics, 2019, Cambridge, MA, pp. 1-5.

Liu, et al., "Single-Channel Speech Separation with Auxiliary Speaker Embeddings," University of Augsburg, Germany, pp. 1-5, 2019.

Zhang, et al., "Deep Learning for Acoustic Echo Cancellation in Noisy and Double-Talk Scenarios," Ohio State University, 2018, pp. 3239-3243.

The International Search Report and The Written Opinion of the International Searching Authority for PCT/US2020/026879, dated Dec. 17, 2020, ISA/RU, Moscow, Russia.

* cited by examiner

SYSTEM AND METHOD FOR AUDIO-VISUAL MULTI-SPEAKER SPEECH SEPARATION WITH LOCATION-BASED SELECTION

TECHNICAL FIELD

The present disclosure relates generally to speech separation techniques and, specifically, to the separation of speech for multiple speakers in consideration of location and gesture information.

BACKGROUND

As recording technologies become increasingly prevalent, the volume of audio, video, and other associated data available for processing increases. The field of speech separation, within the domain of audio-visual processing, is a field of endeavor concerned with isolating, enhancing, and applying recorded or live speech. Often, speech separation is applied to video and audio recordings which may contain multiple speakers, complex background noise, or both. While improvements in the field of speech separation provide for incremental advances, certain limitations prevent the full exploration and leverage of the capabilities of speech separation.

Certain recent works provide for the application of deep-learning speech separation to single-microphone recordings. While deep-learning technologies may be applied to enhance single-microphone speech separation applications, the same or similar deep-learning methods may provide enhanced benefits in conjunction with expanded sensor capabilities and datasets. Specifically, the combination of deep-learning techniques with sensitive microphone arrays may enable some direction-based speech separation features unavailable in single-microphone configurations. However, using an array of microphones without directing such an array to the direction of the speaker would still allow for background noise. Therefore, such a solution does not provide a reliable voice separation solution in a noisy environment.

To allow direction of the microphone array toward a speaker, recent solutions utilize video data to enhance deep-learning speech separation, allowing for speaker isolation, direction-based speech separation, and context-driven speech applications.

In such solutions, a camera is utilized to capture the speakers' face or lip movements to improve the voice separation. By analyzing the face images, an algorithm can learn to read lips to correlate between a voice and captured lip movements to find out which voice belongs to which speaker. However, even image-based solutions fail to provide clear separation when multiple people speak at the same time to the same microphones.

The applications of speech separation provide for further reason to improve speech separation technologies. Speech separation may be applicable in the fields of entertainment and broadcasting, telecommunications, and consumer device control, among others. Specifically, in the field of consumer device control, speech separation may allow for the creation of powerful, intuitive technologies, allowing users to control electronic devices using voice commands.

However, as speech separation technologies are presently ill-equipped for quick, reliable speech processing in noisy environments, environments with multiple users, and other, similar environments, the possible applications of speech separation are limited.

It would therefore be advantageous to provide a voice processing solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for audio-visual multi-speaker speech separation, including: receiving audio signals captured by at least one microphone; receiving video signals captured by at least one camera; and applying audio-visual separation on the received audio signals and video signals to provide isolation of sounds from individual sources, wherein the audio-visual separation is based, in part, on angle positions of the at least one speaker relative to the at least one camera.

Certain embodiments disclosed herein also include a non-transitory computer readable medium having stored thereon instructions for causing a processing circuitry to perform a process, the process including: receiving audio signals captured by at least one microphone; receiving video signals captured by at least one camera; and applying audio-visual separation on the received audio signals and video signals to provide isolation of sounds from individual sources, wherein the audio-visual separation is based, in part, on angle positions of the at least one speaker relative to the at least one camera.

Certain embodiments disclosed herein also include a system for audio-visual multi-speaker speech separation, including: a processing circuitry; and a memory, the memory containing instructions that, when executed by the processing circuitry, configure the system to: receive audio signals captured by at least one microphone; receive video signals captured by at least one camera; and apply audio-visual separation on the received audio signals and video signals to provide isolation of sounds from individual sources, wherein the audio-visual separation is based, in part, on angle positions of the at least one speaker relative to the at least one camera.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
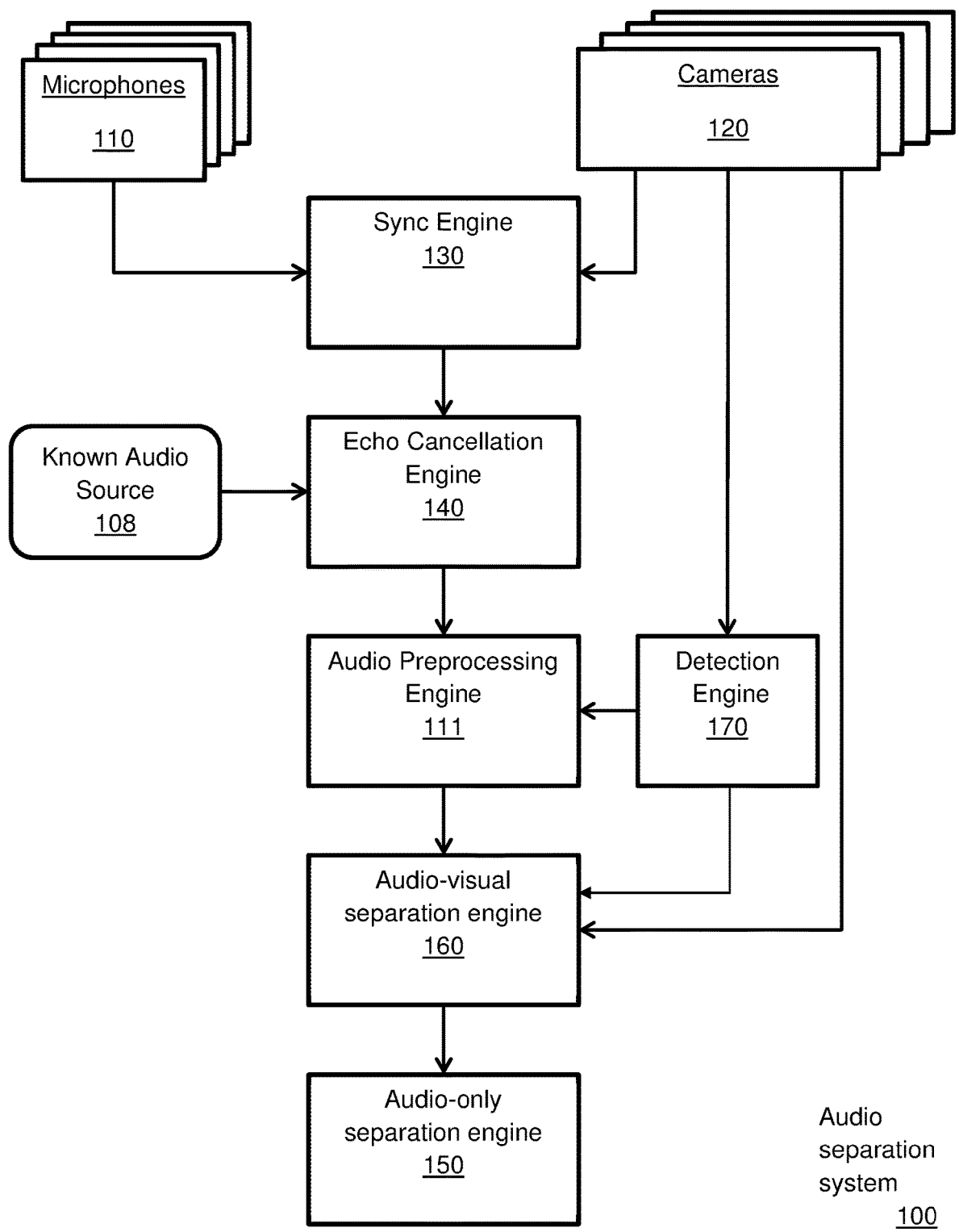
FIG. 1 is a block diagram depicting an audio separation system, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for audio-visual multi-speaker speech enhancing with location and gesture-based selection. In an embodiment, the disclosed embodiments allow for enhancing speech based not only on reading lips, but also for extraction of a user's location or multiple users' locations. In yet another embodiment, the speech enhancing is performed based on detection of human gestures related to a speaker (person).

FIG. 1 is an example block diagram depicting an audio separation system 100, according to an embodiment. In an embodiment, the audio separation system 100 may include a known audio source 108, an array microphones 110, an audio preprocessing engine 111, at least one camera 120, a synchronization (sync) engine 130, an echo cancellation engine 140, an audio-only separation engine 150, an audio-visual separation engine 160, and a detection engine 170. The array of microphones 110 may include one or more microphones (collectively referred to as "microphones" or an array of microphones").

According to the disclosed embodiments, the system 100 includes an audio preprocessing engine 111 and a three-dimensional (3D) movement detection engine 170. The audio preprocessing engine 111 receives, as an input, the audio output of the echo cancellation engine 140 and the output of the detection engine 170. In the case of multiple microphones, the audio preprocessing engine 111 is configured to direct the microphones, and, hence, the audio signals, to the directions from which different speakers are speaking. The audio preprocessing engine 111 operates in response to a control signal received from the 3D movement detection engine 170. The output of the audio preprocessing engine 111 is fed to the audio-visual separation engine 160 and, subsequently, to the audio-only separation engine 150.

In an embodiment, where multiple microphones 110 are arranged in an array, the audio preprocessing engine 111 may be configured to generate a beamformer, normalizing and consolidating the audio inputs from the microphones 110 to capture audio originating from specific sources, positions, or angles.

The 3D movement detection engine 170 is configured to detect and track the speaker's mouth positions in the space, the speaker's gestures, or both. Based on the detection and tracking, the engine 170 may be configured to direct a beamformer generated by the audio preprocessing engine 111 to the speaker and not to background noise. For example, if there are a number of passengers in a car, and a passenger in the back seat speaks, the engine 170 would direct the beamformer to the speaking passenger and not to the driver. In this way, the voice separations performed by the engines 130 through 160 may be made more accurate. The operation of the 3D movement detection engine 170 is discussed in greater detail with respect to FIG. 9, below.

The microphone or array of microphones 110 may record, receive, or otherwise capture sounds external to the audio separation system 100 including, as examples and without limitation, speech, music, background noise, and other, like, sounds. The microphones 110 may be configured to sample audio signals, including, as an example and without limitation, audio signals of 8 kilohertz (KHz) or higher. The microphones 110 may have a pre-determined configuration or may include microphones disposed at various locations determined based on factors including, without limitation, system capacity, application, environmental considerations, other, like, factors, and any combination thereof.

The camera or cameras 120 may record, capture, or otherwise sample images and video external to the audio separation system 100. The camera or cameras 120 may be one or more visual-light cameras, infrared cameras, and any combination thereof. The camera or cameras 120 may be configured to record video with variable capture settings including, as examples and without limitation, resolution, framerate, and other, like, settings. In an embodiment, the camera or cameras 120 may be configured to capture video or images at a framerate of 25 frames per second (fps). The camera or cameras 120 may be arranged in a predetermined configuration or may be disposed at various locations determined based on factors including, without limitation, system capacity, application, environmental considerations, other, like, factors, and any combination thereof. In some configurations, the array of microphones 110 and the camera or cameras 120 are integrated in the same device, e.g., in a smartphone.

The sync engine 130 is configured to compensate for time delay in video and audio processing. In the example embodiment, the sync engine 130 may be configured to accept audio inputs, video inputs, or both. In an embodiment, the sync engine 130 may be configured to output one or more outputs. The operation of the sync engine 130 is described in greater detail with respect to FIG. 2, below.

The echo cancellation engine 140 allows for reduction of audio noise during processing. In the example embodiment, the echo cancellation engine 140 may be configured to accept audio inputs and inputs from a known audio source 108. In an embodiment, the echo cancellation engine 140 may be configured to output one or more outputs. The operation of the echo cancellation engine 140 is described in greater detail with respect to FIG. 3, below.

The known audio source 108 provides one or more audio signals, allowing for the reduction of background noise through the echo cancellation engine 140. The known audio source 108 may output live, low-delay, or saved audio, or any combination thereof. The output from the known audio source may include background sounds which may be included in the audio provided to the echo cancellation engine 140, but which are not relevant to a user's voice commands or conversations. In an embodiment, the known audio source 108 may provide live or low-delay audio, such as streaming, radio, tv, live performances, and other, like, types of live or low-delay audio. Further, known audio source 108 outputs may include saved, stored, or otherwise-archived audio recordings from known sources. Examples of known audio source 108 outputs may include recordings of sports matches, radio broadcasts, television shows, movies, other, like, sources of known audio, and any combination thereof.

The audio preprocessing engine 111 is configured to isolate specific audio channels based on visual gesture detection. The audio preprocessing engine 111 may be configured to accept, as inputs, one or more audio inputs and one or more video inputs. The audio preprocessing engine 111 may include one or more output channels, which may include an audio output. The audio preprocessing channel may be configured to output a silent audio output until a gesture is detected in the video input, at which point the engine 111 may output audio.

Where the audio input includes inputs from more than one microphone 110, the engine 111 may be configured to generate a beamformer, normalizing the audio inputs from multiple microphones 110 based on their known distances from a single sound source. Further, where the video input includes detected faces, the engine 111 may be configured to calculate the angle and position of each face relative to the microphone or microphones 110 and may be configured to calculate the time shift needed between the microphones to extract and enhance audio from the direction of a given face, allowing the engine 111 to include an output audio channel for each face detected. In an embodiment, the audio pre-processing engine 111 may be configured to output one or more audio preprocessing engine 111 outputs to an audio-visual separation engine 160. Further, in an embodiment, the audio preprocessing engine 111 may be configured to determine when speech begins and ends using techniques including gesture analysis.

The 3D movement detection engine 170 is configured to detect and track faces and human gestures. Faces may be detected using facial recognition methods such as, as an example and without limitation, landmark analysis, whereby facial features, such as noses, ears, and eyes, are detected and mapped, generating a depiction of a face, and other, like, techniques.

In an embodiment, faces may be tracked by assigning one or more markers to a facial landmark, such as the eyes or nose, and tracking the movement of the marker as the video progresses, by other, like, techniques, and by any combination thereof. In an embodiment, multiple faces may be detected and tracked simultaneously. Faces may be detected and tracked for video input including, without limitation, live video, slight-delay video, or recorded video. In an embodiment, lips may be tracked as well as, or instead of, faces, using methods similar or identical to those described above.

The detection engine 170 may further extract the size of the lips and angles of the face, the persons age and gender from the image and feed. The extracted information can be fed directly to the neural network of the audio-visual separation engine 160 to assist with the separating between voices. For example, such a neural network can be trained to extract woman voices and male voices, the size of lips can indicate on the distance of the person, and the neural network can be trained to extract quiet voices from a distance, according to the lips size. The neural network at the audio-visual separation engine 160 can also separate 2 persons which appear on the same camera using the lips size, suppose one is near the camera and one is far from the camera, and according to the lips size you separate a strong voice and a quiet voice.

In an embodiment, the detection engine 170 is configured to detect three-dimensional mouth positions. This may be performed by isolating mouth regions in the detected faces and assigning one or more markers to various areas of the mouth. This may include, for example, and without limitation, the top and bottom edges of each of the upper and lower lips, the corners of the mouth, various midpoints calculated algorithmically or by estimate, other, like, areas, and any combination thereof. The 3D mouth positions may be tracked by observing the motion of the assigned markers over the course of a video. In an embodiment, the 3D mouth position points are detected by accurately estimating the position of the detected mouth, relative to one or more microphones.

In yet another embodiment, the engine 170 is configured to detect the mouth positions in space by extracting the human face size or distance between the eyes, for the detected face. The position of the mouth, the current position of a beamformer, and intrinsic properties of the camera may be applied to compute the position of the mouth or other sound source relative to position of the beamformer (and hence the array of microphones 110). The engine 170 is described in greater detail with respect to FIG. 9, below.

The audio-visual separation engine 160 allows for the separation of audio inputs into component channels, by audio source, based on video data. For example, such channels may include audio played from a radio and the conversation of passengers in a car.

In the example embodiment, the audio-visual separation engine 160 may be configured to accept, as inputs, one or more audio preprocess engine 111 outputs. In an embodiment, the audio-visual separation engine 160 may be configured to output one or more outputs. In an embodiment, the audio-visual separation engine 160 is further configured to perform automatic speech recognition (ASR) functions to further enhance speech and improve transcription. The ASR function may output text for each detected voice channel, i.e., performing speech-to-text for each channel. The output of the ASR function is a natural language processing (NLP) technique that may be applied to parse text inputs. The operation of the audio-visual separation engine 160 is described in greater detail with respect to FIG. 6, below.

The audio-only separation engine 150 is configured to separate audio inputs into component channels, wherein each component channel reflects one audio source captured in the audio input. In the example embodiment, the audio-only separation engine 150 may be configured to accept audio inputs. In an embodiment, the audio-only separation engine 150 may be configured to output more than one output. The operation of the audio-only separation engine 150 is described in greater detail with respect to FIG. 4, below.

Any of the engines included in the system 100 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

While the engine diagram depicts the sync engine 130, echo cancellation engine 140, audio-only separation engine 150, and audio-visual separation engine 160 as receiving inputs from various components, from the one or more microphones 110, and from one or more cameras 120, the engines 130-160 may each include one or more outputs, including outputs which are inputs for other engines 130-160 or other components.

Further, in some configuration an audio detection engine (not shown) is connected to microphone(s) 110 to an audio detection block and then to the audio visual separation engine 160. From the audio, information about the environment can be extracted, e.g., information about in-doors or outdoors environment, according to the amount of reverberations, also there are articles that using neural network tries the estimate the distance of the speaker from the microphone according to sound only.

Figure 2:
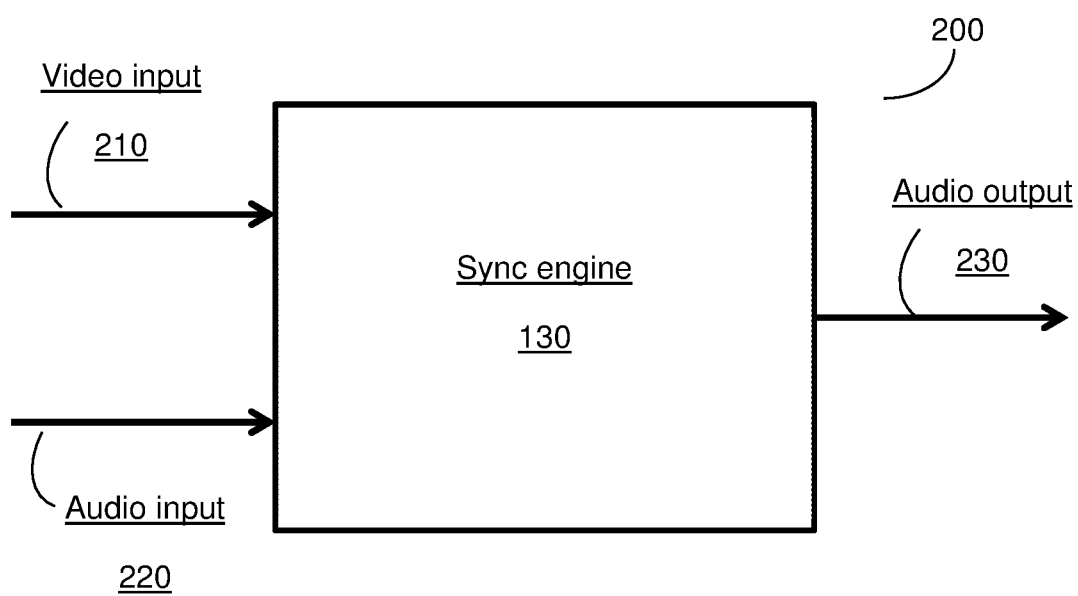
FIG. 2 is an engine diagram depicting a sync engine, according to an embodiment.

FIG. 2 is an example engine diagram 200 depicting a sync engine 130, according to an embodiment. As noted above, the sync engine 130 may be configured to compensate for time differences arising when separate audio and video signals reach a processor at different times. The sync engine 130 may be configured to apply various algorithms such as, as examples and without limitation, deep-learning, artificial intelligence (AI), machine learning, and the like. In an embodiment, the sync engine 130 may be configured to correlate audio and video providing, as an example, a synchronization of a human voice with recorded lip movement.

In an embodiment, the sync engine 130 may be configured with a pre-evaluated time difference parameter. In an alternate embodiment, the sync engine 130 may be configured to establish synchronization and time differences using algorithms for automatic synchronization, such as to correlate lip movement and speech. In a further embodiment, the sync engine 130 may be configured to evaluate time differences using neural networks and other, like, techniques.

In an embodiment, the sync engine 130 may be configured to apply deep learning methods to audio-visual synchronization. To this end, the sync engine 130 may take, as inputs, audio 220 and video 210 signals and produce an audio output 230. The sync engine 130 may compare an audio vector and a video vector, derived from the respective audio 220 and video 210 inputs, to compute a correlation score by shifting either the audio vector or the video vector and comparing the shifted vector against the remaining, unshifted vector. The number of shifts needed to achieve a match determines the correlation score. The time shift value are determined by the number of shifts that received the highest correlation score. In an embodiment, the audio output 230 may be a time-shifted variant of the audio input 220. Further, the audio output 230 may be a time-shifted variant of the audio input 220, time-shifted to synchronize with lip movements in the video 210 input.

Where the sync engine 130 is configured to apply deep-learning analysis, as described, the algorithm applied may include calculations factoring that one person is in front of a camera, and that the input to the algorithm is the person's face or lips, as determined by a face detection algorithm. The face detection algorithm may be applied by the sync engine 130, by another component, or by the sync engine 130 and another component.

Where the sync engine 130 is configured to apply a deep learning method, as described above, and where multiple faces are included in the video input 210, the sync engine 130 may identify a single face from the video input 210 and correlate the audio input 220, where the correlation between the video input 210 and the audio input 220 may indicate a correlation score. A single face may be identified based on input received from the 3D movement detection engine 170.

The sync engine 130 may select the face-audio pairing which produces the highest correlation score and estimate a time-shift correction based on the selected face. In an embodiment, where the audio input 220 is processed by audio-only speech separation prior to analysis at the sync engine 130, the sync engine 130 may select each chosen face and each audio channel as inputs and select, based on these inputs, the video input 210 and audio input 220 which result in the highest correlation score, selecting the video-audio pairing for time-shift estimation.

The sync engine 130 may be implemented in software, firmware, hardware, or a combination thereof. When implemented in hardware, the sync engine 130 may be realized as one or more hardware logic components and circuits, as discussed above.

Figure 3:
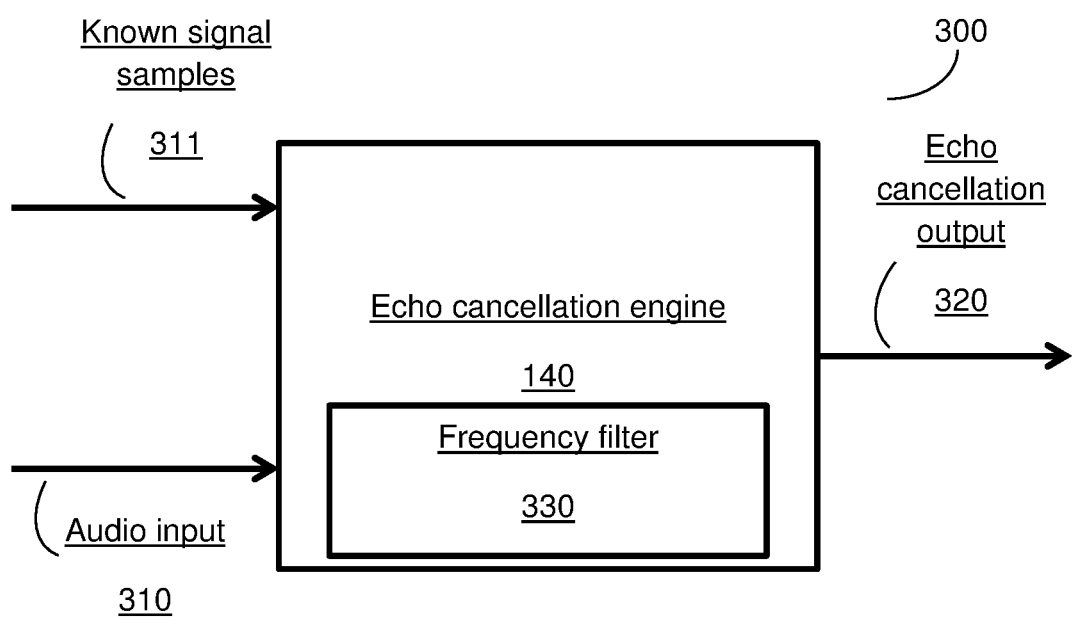
FIG. 3 is an engine diagram depicting an echo cancellation engine, according to an embodiment.

FIG. 3 is an example engine diagram 300 depicting an echo cancellation engine 140, according to an embodiment. The echo cancellation engine 140 may be configured to reduce known signal samples 311 in sampled audio. In an example, the echo cancellation engine 140 may be configured to remove the sound of a known radio channel from a captured audio input 310. In an embodiment, the echo cancellation engine 140 may be configured to apply deep learning techniques to learn a frequency filter, wherein the frequency filter 330 may estimate sound decay in every frequency recorded by a microphone 110. The frequency filter 330 may be a bandpass filter, a low pass filter, a high pass filter, and the like.

In an embodiment, the echo cancellation engine 140 may be configured to accept an audio input 310, which may be recorded by a microphone or microphones 110 or which may output from another device or process, and known signal samples 311 from electronic devices, such as TV, radio, and the like. The echo cancellation engine 140 may be configured to remove known signal samples 311 from an audio input 310, and may be configured to output an echo cancellation output 320 which may include audio received from the audio input 310, modifications to the audio received from the audio input 310, other audio, and any combination thereof. Examples of known signals may include, without limitation, radio and television broadcasts, stage performance and sports match recordings, other, like, recordings or broadcasts, and any combination thereof. Specifically, the output 320 may include clear audio signals without any echo or cancellation noises.

In an embodiment, the echo cancellation engine 140 may be configured to remove known signal samples 311 using algorithms based on information including, without limitation, time correlations between the time that a signal is sampled at the echo cancellation engine 140 and the time at which the signal is sampled by the source, such as a microphone 110, frequency filters 330 measuring the amplitude of frequency decay at a source, such as a microphone 110, other, like, information, and any combination thereof.

The sync engine 130 may be implemented in software, firmware, hardware, or any combination thereof. When implemented in hardware the sync engine 130 may be realized as one or more hardware logic components and circuits discussed above.

Figure 4:
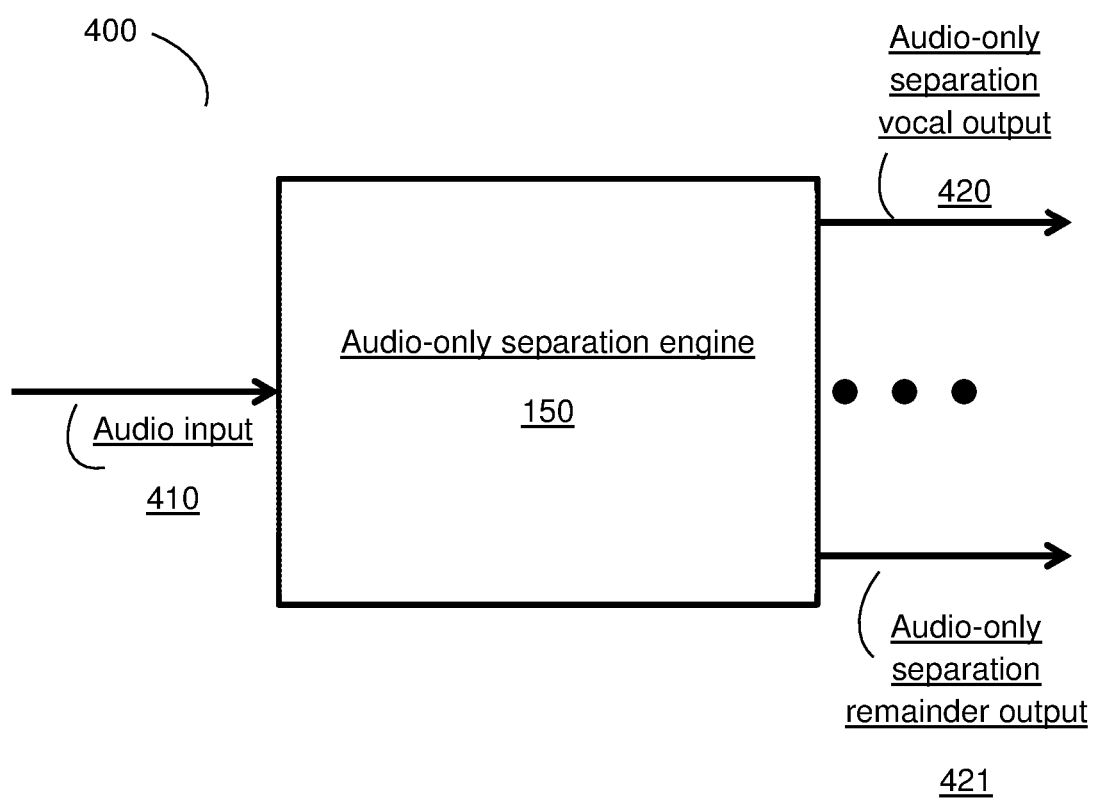
FIG. 4 is an engine diagram depicting an audio-only separation engine, according to an embodiment.

FIG. 4 is an example engine diagram 400 depicting an audio-only separation engine 150, according to an embodiment. The audio-only separation engine 150 may be configured to separate an audio input 410 into at least one audio-only separation vocal output 420 and at least one audio-only separation remainder output 421. In an embodiment, the audio-only separation vocal output 420 includes audio signals from a unique source, such as a single human speaker. The audio-only separation engine 150 may be configured to determine whether the audio input 410 contains human voice. As an example of the separation of audio, the audio-only separation engine 150 may be configured to isolate and extract the voice of one person from a conversation including multiple speakers, outputting the single speaker's voice as a single, isolated channel.

It should be noted that when there are a number of cameras 120 and more the one microphone 110, each microphone can extract the sound of a person in front of the specific microphone (using the camera) and use the information as noise or as echo cancellation to the other microphones. This provides a complete voice separation in environments that are multiple speaker talking at the same time. It should be further noted that the embodiments disclosed herein can operate when the cameras 120 are microphones are distributed.

In a further embodiment, when the human voice is included in the audio input 410, the audio separation engine may be configured to split the audio input 410 into two channels, wherein a single channel includes a specific human voice, and where the remaining channel includes the contents of the audio input 410 without the selected specific human voice.

In an embodiment, where multiple human voices are detected in the audio input 410, the audio separation engine may be configured to treat the audio-only separation remainder output 421 channel, containing audio other than the human voice previously isolated, as an input, repeating the isolation of specific human voices to unique channels until every human voice included in the audio input 410 is separated into a distinct audio-only separation vocal output 420 channel.

In an embodiment, the audio-only separation engine 150 may be configured to separate human voices by voice frequency and time of speech. This may be executed based on the assumption that speakers do not speak at exactly the same time, enabling the audio-only separation engine 150 to learn each speaker's voice and to separate voices into distinct channels.

In an embodiment, the audio-only separation engine 150 may be configured to detect whether at least one human speaker is included in the audio input 410 using, for example, a neural network. The audio-only separation engine 150 may be configured to apply neural networks and associated techniques to determine whether the audio input 410 contains at least one human voice, to separate human voices into distinct audio channels, or both. Where the audio-only separation engine 150 is configured to only separate one human voice into a separate channel, the audio-only separation engine 150 may, as above, use the separated channel, containing the audio input 410 without the separated speech, as an input, repeating human voice separation until each speaker's speech is separated into a unique audio-only separation vocal output 420.

In an embodiment, where multiple microphones 110 are arranged in an array, the microphones 110 may be disposed with a known distance between two microphones 110, allowing the calculation of sound source position based on the differences in time measured between multiple microphones 110 in the array recording the same sound. Specifically, as microphones 110 in an array are separated by known or calculable distances, and as sound travels at a known speed, the time difference between a sound reaching a first microphone 110, disposed at a known position, and a second microphone 110, disposed at a second known position allows, with consideration of the distance between the microphones 110, a calculation which may indicate the position of a sound source.

Figure 5:
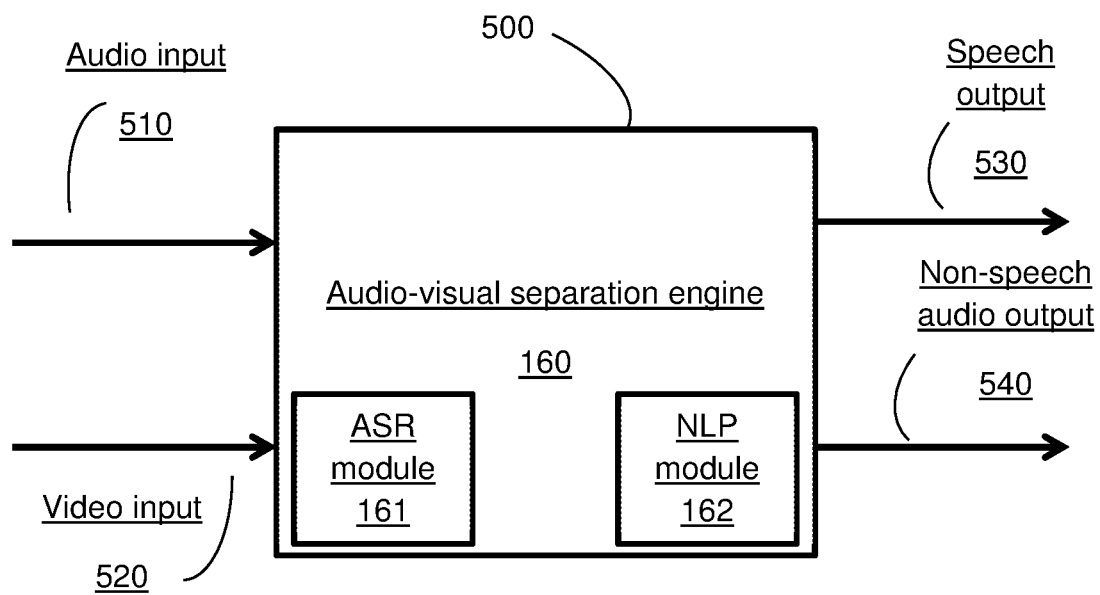
FIG. 5 is an engine diagram depicting an audio-visual separation engine, according to an embodiment.

FIG. 5 is an example engine diagram 500 depicting an audio-visual separation engine 160, according to an embodiment. The audio-visual separation engine 160 may be configured to accept video inputs 510 and audio inputs 520 and to output a speech output 530 and a non-speech audio output 540. The speech output 530 may include the speech of a human speaker speaking in front of a camera 120. Where multiple human speakers are speaking in front of a camera 120, the audio-visual separation engine 160 may be configured to repeat the process, generating a second speech output 530 for the second speaker, and engaging the audio-only separation engine 150, discussed above, when no human speakers remain speaking in front of a camera 120.

In an embodiment, the audio-visual separation engine 160 may be configured to analyze the accepted video input 510 and to detect a human face, human lips, or both. The audio-visual separation engine 160 may be configured to produce speech outputs 530 and non-speech audio outputs 540 by processing the accepted video input 510 and audio input 520 using neural networks and may, in an embodiment, apply neural networks to audio-visual separation using a detected human face, human lips, or both.

In an embodiment, the applied neural network may include a predefined number of audio input channels, where each channel includes an additional flag, such as a bit with a value of zero or one, indicating whether a specific voice exists in the audio input channel. The neural network applied may further include a predefined number of audio embeddings with an additional flag describing whether a vector exists, a predefined number of face or lip areas, including additional flags indicating whether a face exists in an image, other, like, inputs, and any combination thereof. The applied neural network may further include an additional input channel consisting of an original audio channel to which echo cancellation processing has been applied but to which separation has not.

In an embodiment, the audio-visual separation engine 160 may, to enable neural network processing and separation, accept audio channels with strong lip or face correlations, together, and an audio channel consisting of a received audio input, separated into a vocal audio channel and a noise channel by methods including those described as above, wherein the accepted audio channel may be directed into an audio embedding module to generate an audio embedding vector for comparison with existing audio embeddings.

In an embodiment, where similarity is determined based on a correlation score, specific audio embeddings may be assigned to an audio input 520 channel, wherein the audio-visual separation engine 160 may use the audio input 520 channel as an input for a second neural network, in addition to an original audio input, an associated video input, and associated audio embeddings, generating, as outputs, a clean audio channel, a noise channel, and a new audio embeddings channel. Similarly, the audio-visual separation engine 160 may extract audio channels associated with faces or lips to generate corrected audio channels including only specified voices.

In an embodiment, the audio-visual separation engine 160 may accept, as inputs, audio embeddings of human voices, known sounds previously considered, predefined audio embeddings, other, like, inputs, and any combination thereof. An audio embedding may be a vector of numbers characterizing a specific sound.

In an embodiment, the audio-visual separation engine 160 includes an automatic speech recognition (ASR) module 161 to further enhance speech and improve transcription. The ASR module 161 outputs text for each detected voice channel, i.e., performs speech-to-text. The engine 160 further includes an NLP module 162 configured to apply a natural language processing (NLP) technique to parse the text provided by the ASR module 161.

Figure 6:
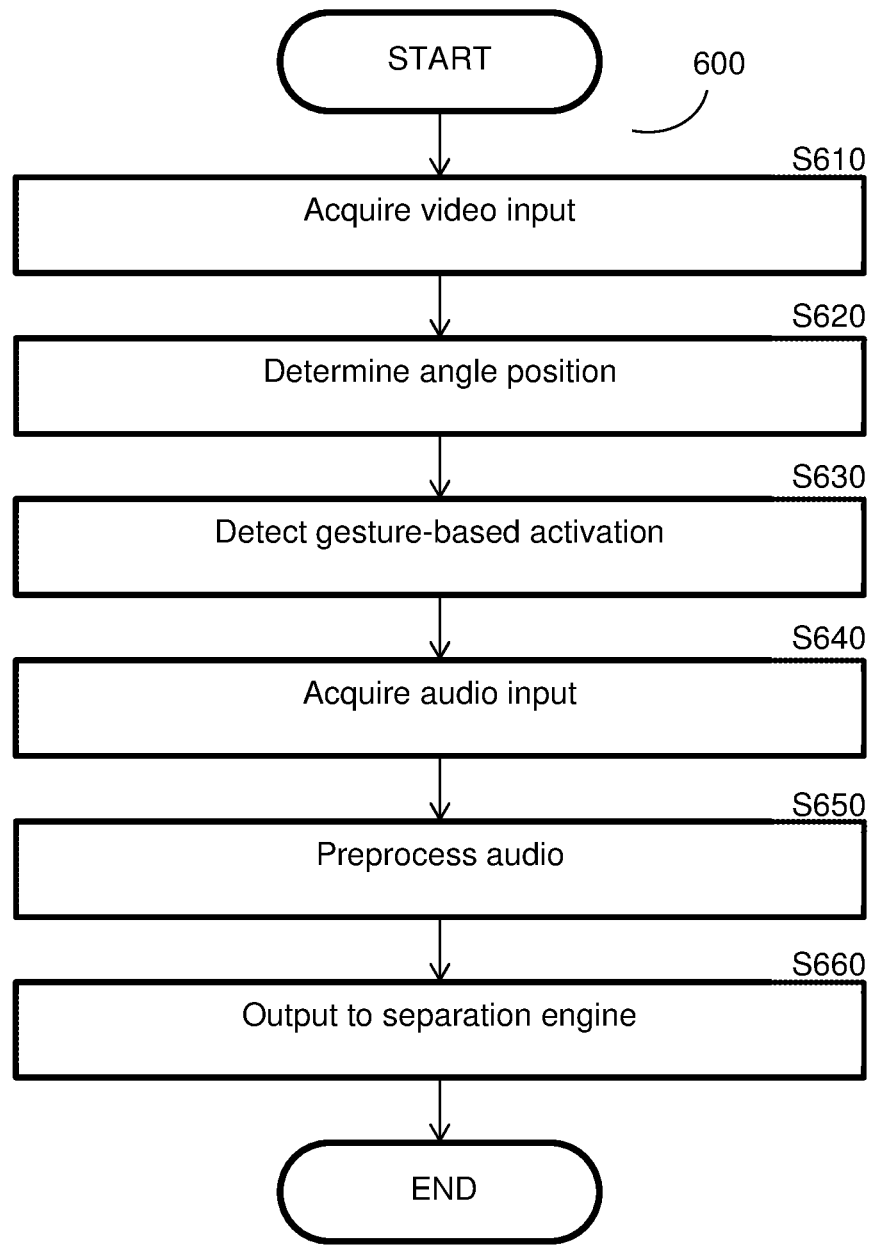
FIG. 6 is a flowchart depicting a method for preprocessing captured audio/video signals according to an embodiment.

FIG. 6 is a flowchart 600 depicting a method for preprocessing captured audio/video signals according to an embodiment. Preprocessing audio prior to separation provides for the filtering of ambient sound, as well as the determination of whether a user intends to interact with a voice-control feature. Preprocessing audio prior to separation may prevent the execution of separation and other methods in a case where a user speaks without intending to interact with a voice-control system, conserving computational resources and providing low-wait availability when a user intends to interact with the system.

At S610, video input is acquired. Video input may be acquired from one or more cameras 120. The acquired video input may include video depicting one or more sound sources including, without limitation, human speakers. The acquired video input may be live, where the video input is acquired as it is captured by a camera 120, slightly delayed, as with a buffered or moderated live broadcast, or delayed at length, as with a previously-recorded video stored in a medium, as discussed above.

At S620, angles and positions of speakers are detected. The angle and position of a speaker relative to the camera or cameras 120 may be analyzed to improve gesture analysis or to assess recorded gestures from different angles. As a gesture may take a different appearance when viewed from multiple angles, determination of the angle and position may allow for improved gesture analysis.

At S630, gesture-based activation is detected. Gesture-based activation may be a user gesture indicating that a user intends to interact with a voice-control system. The initiation of a person to talk is an example for gesture-based activation. Additional examples of activation gestures may include, without limitation, holding the head at an angle for a given time, nodding or shaking the head, holding out the left or right hands, other, like, gestures, and any combination thereof. Gesture-based activation may be detected by several methods including, without limitation, use of neural networks to detect movement patterns, other, like, methods, and any combination thereof. Where neural networks are employed to detect gesture-based activation, a neural network training scheme may be employed, wherein one or more neural networks may be trained using real examples of users attempting to interact with a voice-command system, as well as examples of users speaking without the intent to interact with a voice-command system.

At S640, audio input is acquired. Audio input may be acquired from live sources, including the array of microphones 110, recorded sources, such as audio corresponding to a stored video, audio stored independently of video, other, like, sources, and any combination thereof. The acquired audio input may include human speech, background sounds, or both.

It may be noted that S640 may occur at any point prior to the execution of S650, including concurrently with S630 or S610, without any loss of generality or departure from the scope of the disclosed. Further, S610 may not execute concurrently with or after S630, and S630 may not execute concurrently with or after S650.

At S650, the acquired audio is preprocessed. In an embodiment, audio preprocessing at S650 may include terminating the execution of the gesture-based voice activity detection process described in the flowchart 600 where an activation gesture is not confirmed at S630. In an embodiment, audio preprocessing at S650 may include proceeding to S660 where an activation gesture is detected or partially detected at S630.

At S660, the preprocessed audio and video is outputted to the audio-visual separation engine 160 (see FIG. 1) as an audio channel and a video channel. In an embodiment, outputting preprocessed audio to the audio-visual separation engine 160 may include outputting multiple audio channels, multiple video channels, or any combination thereof. In an alternate embodiment, outputting preprocessed audio and video at S660 may include outputting one or more audio channels to the audio-only separation engine 150.

Figure 7:
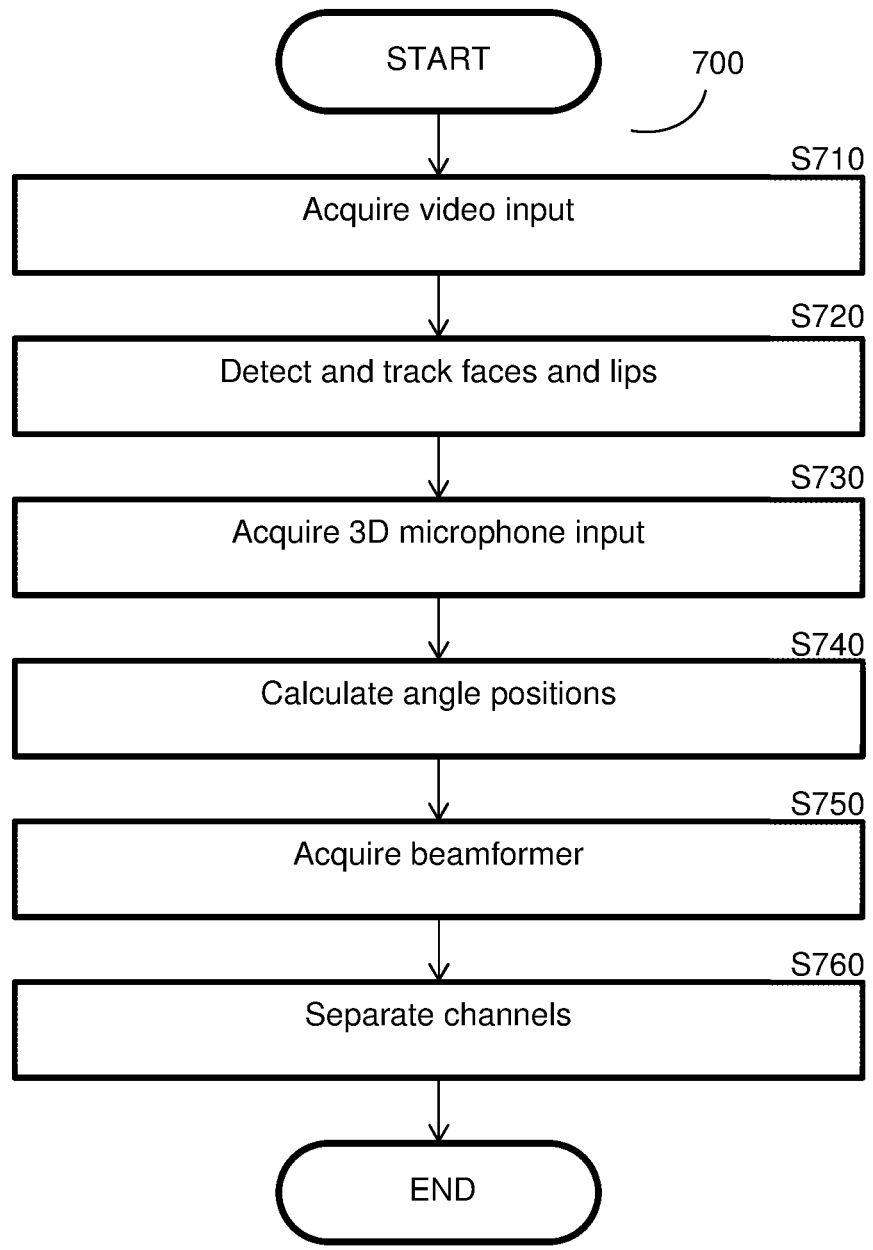
FIG. 7 is a flowchart depicting a process for audio-video separation according to an embodiment.

FIG. 7 is an example flowchart 700 depicting a process for audio-video separation according to an embodiment. The audio separation provides for the isolation of sounds from individual sources, and the assignment of each sound source to a distinct channel. The separation process provides for the output of multiple channels, each containing sound from a single source, for subsequent analysis or processing. Separation may be useful in the isolation of a single speaker's voice, allowing voice commands, conversation, and other speech to be recorded, analyzed, and applied despite other, surrounding sounds and voices.

At S710, video input is acquired. Video input may be acquired from one or more cameras. The acquired video input may include video depicting one or more sound sources including, without limitation, human speakers. The acquired video input may be live, where the video input is acquired as it is captured by a camera 120, slightly delayed, as with a buffered or moderated live broadcast, or delayed at length, as with a previously-recorded video stored in a medium, as discussed above.

At S720, faces and lips may be detected and tracked. Faces and lips may be detected using facial recognition methods such as, as an example and without limitation, landmark analysis, whereby facial features, such as lips, noses, ears, and eyes, are detected and mapped, generating a depiction of a face, and other, like, techniques. Faces may be tracked by assigning one or more markers to a facial landmark, such as the eyes or nose, and tracking the movement of the marker as the video progresses, by other, like, techniques, and by any combination thereof. In an embodiment, multiple faces may be detected and tracked simultaneously. Faces may be detected and tracked for video input including, without limitation, live video, slight-delay video, or recorded video. In an embodiment, lips may be tracked as well as, or instead of, faces, using methods similar or identical to those described above.

At S730, audio signals (input) captured by an array of microphones directed to a specific position in the space (three-dimensional) are acquired or received. Audio signals may be acquired from a microphone or an array of microphones, recorded sources of three-dimensional audio, such as audio corresponding to a stored video, audio stored independently of video, other, like, sources, and any combination thereof. The acquired three-dimensional microphone input may include human speech, background sounds, or both.

At S740, angle positions are determined or otherwise calculated. Angle positions describe the spherical angles between the source of a sound and a camera and a microphone. In an embodiment, the angle positions may describe the position of a human speaker relative to one or more cameras or microphones, and may describe the position of a speaker's face relative to the camera or microphone, wherein the speaker may be determined by analysis of the face or faces tracked at S720. The calculation of angle positions requires the assessment of several factors, including attributes of images captured by the cameras, the intrinsic parameters of the camera or cameras, and factors describing the angle and position of the sound source. As variability in applying subsequent methods may arise due to the attributes of the hardware used, correcting for these attributes may allow for greater efficacy in subsequent steps.

Relevant captured image attributes define the field of view and distortion of the image and include image coordinates, given as pairs of the form (x,y), describing the position of a set of lips in the captured image. Captured image attributes further include undistorted image coordinates, ($X_{corrected}$, $Y_{corrected}$), describing the position of a set of lips in an undistorted image. In addition, captured image attributes may include three-dimensional world coordinates, (X, Y, Z), describing the position of a set of lips centered on an image relative to the camera position.

Relevant camera intrinsic parameters include the field of view, F, the distortion coefficient, D, and the camera's 120 optical center, described by the coordinate pair, ($O_x$, $O_y$). Further, relevant position and angle attributes include the mouth angle position relative to the camera 120, ($M_\theta$, $M_\varphi$), the mouth angle position relative to the microphone, ($P_\theta$, $P_\varphi$), the camera 120 angle position relative to the microphone 110, ($CAM_\theta$, $CAM_\varphi$), and the horizontal and vertical distance between microphones, DX and DY. Camera intrinsic parameters may be determined by reference to manufacturers' specifications, user manuals, and other, like, sources of information, by analytic methods, or by a combination of referential and analytic methods.

The application of these factors to the calculation of angle positions requires the initiation of a correcting algorithm, repeated for each detected face or set of lips. The conversion of image coordinates (x,y) into undistorted image coordinates ($X_{corrected}$, $Y_{corrected}$) using the distortion coefficient D may be using techniques discussed in the related art.

The image coordinates (x,y) are converted into three-dimensional world coordinates (X, Y, Z) by the formula:

$$(X,Y,Z) = (X_{corrected} + O_x, Y_{corrected} + O_y, F)$$

The angles relative to the mouth, in spherical coordinates, given as ($M_\theta$, $M_\varphi$), relative to the camera, is determined by the formulae:

$$M_\theta = \left(\frac{X}{Z}\right)$$

$$M_\varphi = \left(\frac{Y}{\sqrt{(X^2+Z^2)}}\right)$$

The mouth angle position relative to the microphone, ($P_\theta$, $P_\varphi$), is determined by the following formula:

$$(P_\theta, P_\varphi) = (M_\theta, M_\varphi) + (CAM_\theta, CAM_\varphi)$$

The original input from each microphone may be time-shifted, and the inputs from all microphones may be summed, to extract enhanced audio from a specific direction. The extraction is based on analysis of the variables ($P_\theta$, $P_\varphi$) and DX and DY and performed using techniques discussed in the related art.

At S750, a beamformer is acquired. The beamformer acquired may be generated from the angle positions calculated at S740 and may include inputs from one or more microphones 110, as well as the locations and distances of each microphone 110. In an alternate embodiment, the beamformer may be acquired from an external source, such as may be the case for a beamformer pre-configured for a specific application.

At S760, channels are separated by their contents. The separation of channels may include some or all aspects of the audio-visual separation engine 160 described in FIG. 5, below, the audio-only separation engine 150 described in FIG. 4, below, other, like, separation methods or systems, and any combination thereof. In an embodiment, the separation of channels by their contents may include the isolation of sounds from their individual sources. Further, the separation of channels by their contents may include audio-visual separation based on factors including, without limitation, the properties of the beamformer acquired at S750, the angle positions calculated at S740, other, like, factors, and any combination thereof.

Figure 8:
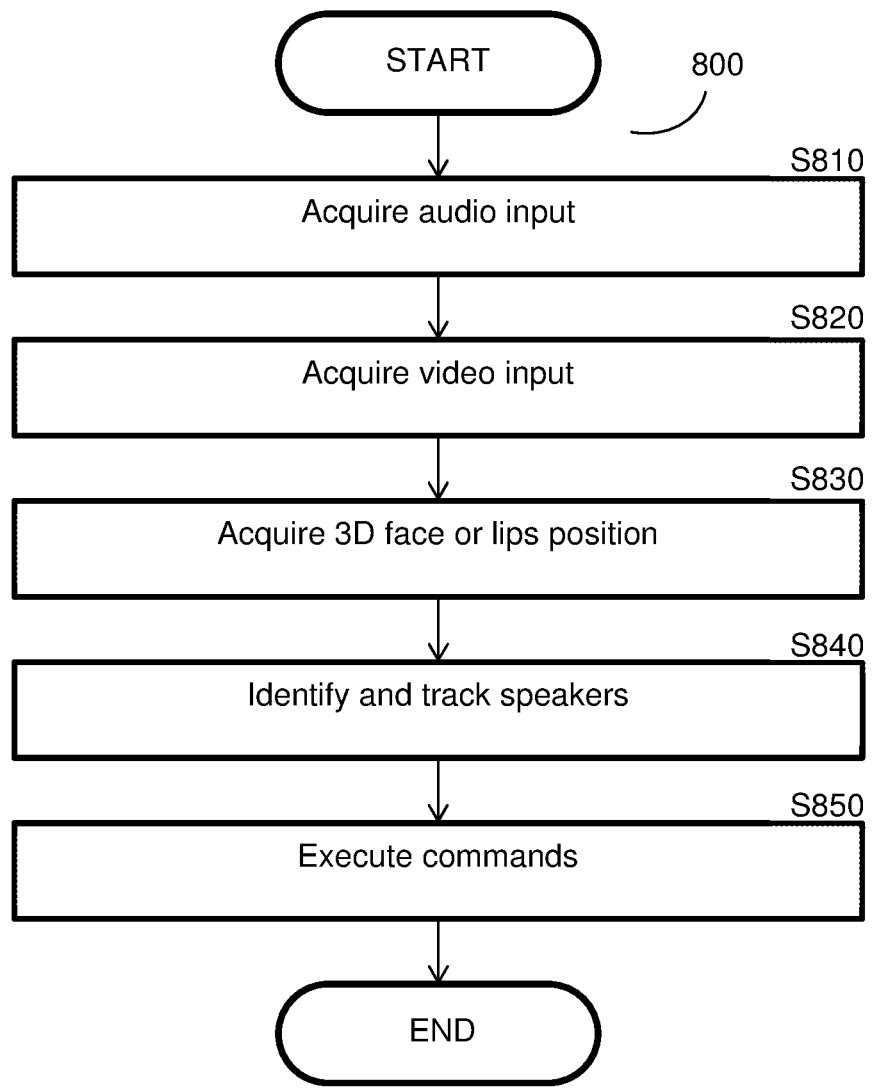
FIG. 8 is a flowchart depicting a process for voice command personalization, according to an embodiment.

FIG. 8 is an example flowchart 800 depicting a process for voice command personalization, according to an embodiment. Voice command personalization provides for speaker selection in the execution of voice commands and other applications of detected speech. In an embodiment, processes for voice activity detection may be stored on various media, may be implemented or executed through hardware such as, as examples and without limitation, the separation engine described with respect to FIG. 2, above, other, like, components, or any combination thereof, or may be both stored on various media and executed or implemented through hardware. Further, voice command personalization may be implemented based on the contents of separated voice channels generated previously or concurrently.

At S810, audio input is acquired. Audio input may be acquired from live sources, including one or more microphones 110, recorded sources, such as audio corresponding to a stored video, audio stored independently of video, other, like, sources, and any combination thereof. The acquired audio input may include human speech, background sounds, or both.

At S820, video input is acquired. Video input may be acquired from one or more cameras 120. The acquired video input may include video depicting one or more sound sources including, without limitation, human speakers. The acquired video input may be live, where the video input is acquired as it is captured by a camera 120, slightly delayed, as with a buffered or moderated live broadcast, or delayed at length, as with a previously-recorded video stored in a medium, as discussed above.

At S830, three-dimensional face or lip positions are acquired. Three-dimensional face or lip positions may be detected by isolating mouth regions, faces, or both in the video input acquired at S820 and assigning one or more markers to various areas of the lips or face such as, as examples and without limitation, the top and bottom edges of each of the upper and lower lips, the nose, the eyes, various midpoints calculated algorithmically or by estimate, other, like, areas, and any combination thereof. Three-dimensional face and lip positions may be tracked by observing the motion of the assigned markers over the course of a video. Where three-dimensional face or lip position points are detected using the techniques described, one or more algorithms may accurately estimate the position of the detected face or lip, relative to one or more microphones.

It may be noted that steps S810, S820, and S830 may execute out-of-order without any loss of generality or departure from the scope of the disclosed. In no case can S810 or S830 execute concurrently with or after S840, and in no case can S820 execute concurrently with or after S830. In an embodiment, S810 may execute concurrently with S820 or S830.

At S840, speakers are identified and tracked. Using the three-dimensional face or lip positions acquired at S830, speakers may be identified and tracked. Speakers may be identified by techniques such as, as examples and without limitation, correlating, via a sync net technique, whereby lip movement is synchronized with audio, changes in detected lip position, i.e. lip movement, as acquired at S830, with spoken words extracted from the audio input acquired at S810 to identify speakers, other, like techniques, and any combination thereof. Speakers may be tracked by techniques such as, as examples and without limitation, assigning a unique token or other identifier to a three-dimensional lip position acquired at S830 and tracking unique tokens or identifiers throughout the execution of the gesture-based voice detection activity process, other, like, techniques, and any combination thereof. Tracking speakers throughout the personalization process may allow for persistent recognition of a given speaker despite the speaker's movements, the addition of additional speakers, other complicating factors, and any combination thereof.

At S850, commands are executed. The execution of commands may include the extraction of commands from the audio input acquired at S810 and the processing of the extracted audio using techniques such as, as examples and without limitation, ASR, as described with respect to S1060 of FIG. 10, below, NLP, as described with respect to S1070 of FIG. 10, below, other, like, techniques, and any combination thereof. The execution of commands may include the contextualization of commands using data including the speakers identified and tracked at S840, as well as other relevant data.

In an embodiment, the execution of commands at S850 may include the execution of contextual commands. Where a system is configured to include hardware features at locations which may be prescribed or otherwise determined, execution of commands at S850 may include execution of commands regarding certain hardware features. Where both the position of a hardware device and the position of a speaker's face, as acquired at S830, are known, the execution of commands at S850 may allow for the execution of hardware feature commands using the known hardware and speaker position information. As an example of contextual command execution, a speaker may be riding in the passenger seat of a car with other occupants. Although other occupants may be present and speaking, and although the speaker might move slightly within the car, the speaker may be identified and tracked in three dimensions, as at S830. Where the speaker issues a voice command, such as "open the window," the command may execute using hardware position information, allowing for the execution of the "open the window" command with respect to the window closest to the speaker.

Figure 9:
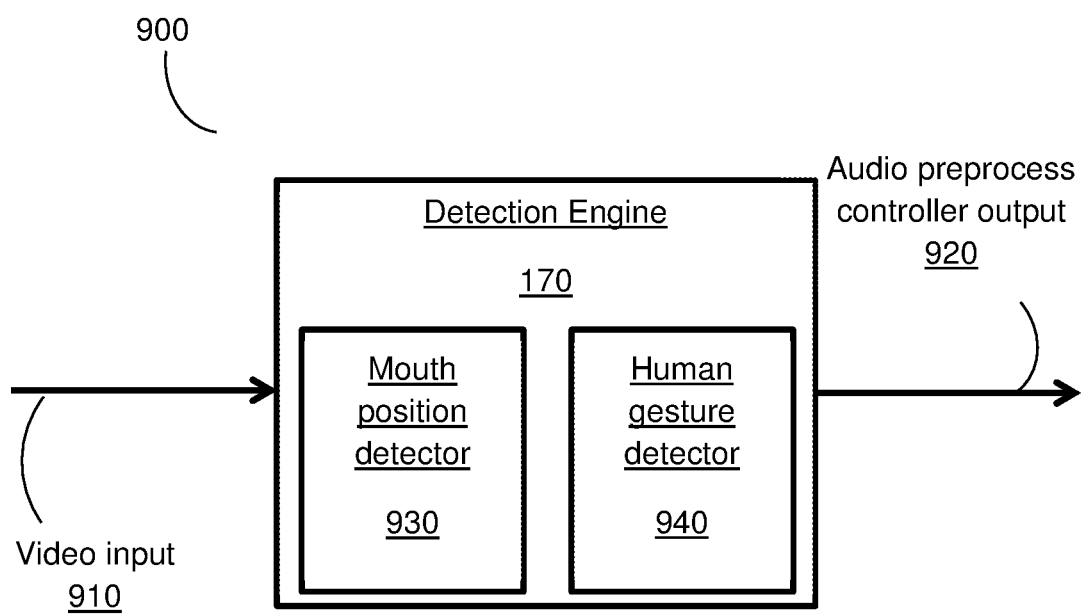
FIG. 9 is a block diagram depicting the 3D movement detection engine according to an embodiment.

FIG. 9 is an example block diagram depicting the 3D movement detection engine 170 according to an embodiment. The engine 170 may be configured to accept video inputs 801 from the camera(s) 110 (FIG. 1) and to output an audio preprocess controller output 920 to control the audio preprocessing engine 111.

The engine 170 includes a 3D mouth position detector 930 and a human gesture detector 940. The mouth position detector 930 is configured to accurately estimate the 3D position of the mouth relative to a microphone's current position. As noted above, this may be performed by extracting the human face size or distance between the eyes in the image (which is almost the same for most humans), using the position of the mouth inside the image and the camera intrinsic parameters (focal length, optical center and distortion parameter, and the known microphone 110 or array of microphones location.

The mouth position detector 930 is configured to compute the 3D position using the extracted data. The mouth position detector 930 is configured to generate a control signal to aim the array of microphones to sample sounds from specific 3D mouth positions. This allows for significant reduction in recorded non-speech noises. In an embodiment, the mouth position detector 930 may implement a neural network to compute the 3D position, where the various extracted parameters are inputs to the neural network.

The gesture detector 940 is configured to detect human gestures. A gesture may be a hand gesture, a head gesture, and the like. To this end, the video input 910 which may be an image of the upper body, full body, or just the head, is processed by a neural network to detect one or more gestures. The detected gestures may be preconfigured, in an embodiment by setting the human gesture detector 940. In another embodiment, the neural network can automatically learn gestures associated with a person's intention to speak voice commands. Training the network may be achieved based on previous videos in which a person gives voice commands and videos in which the person talks without giving voice commands, allowing the network to learn the user's intention to give voice commands.

The detected gesture may trigger a beamformer control signal to direct the array of microphones in the direction of the person performing the detected gesture. In an embodiment, the beamformer control signal may also trigger activation of the microphones.

Figure 10:
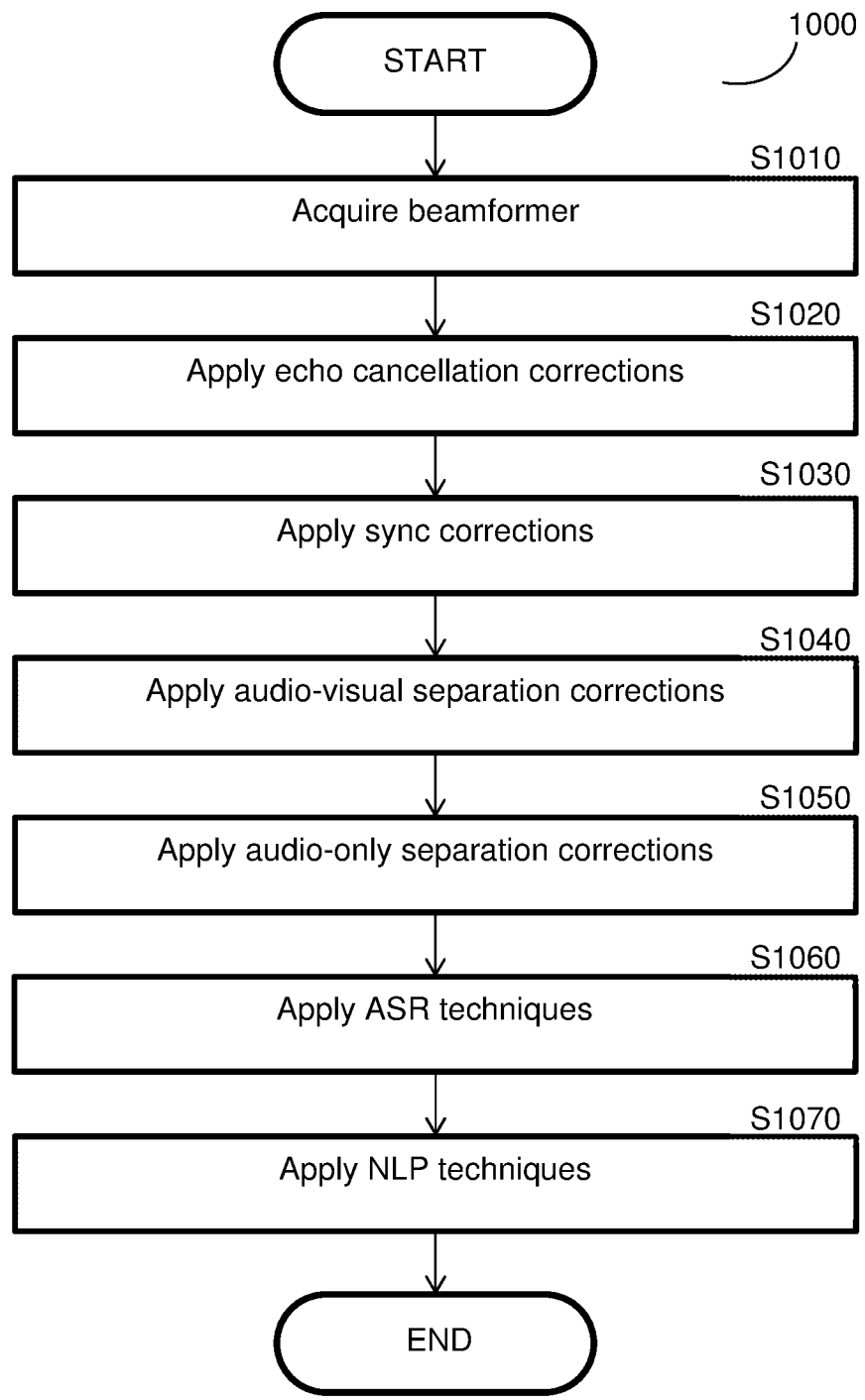
FIG. 10 is a flowchart depicting a process for audio-visual speech separation with location-based selection according to an embodiment.

FIG. 10 is an example flowchart 1000 depicting a process for audio-visual speech separation with location-based selection according to an embodiment. At S1010, where more than one microphone is deployed, a beamformer control signal is generated. The beamformer control signal is generated by the detection engine 170 (see FIG. 1) based on the captured video. The generation of the beamformer control signal is performed by the detection engine 170, and as further discussed in FIG. 11.

At S1015, the beamformer is positioned with respect to the control signal. This allows for the sampling of audio signals from specific 3D mouth positions.

At S1020, echo cancellation corrections are applied to audio signals. In an embodiment, S1020 may include aspects, elements, or processes described with respect to the echo cancellation engine 140 of FIG. 3, above, aspects, elements, or processes of another echo cancellation implementation, or any combination thereof. Where multiple microphones 110 are arranged in an array, as described above, the echo cancellation corrections at S1020 may include, as inputs, audio inputs for each mouth position. Where a single microphone 110 is deployed, the echo cancellation corrections applied at S1020 may include, as an input, the audio signal of the single microphone 110. Further, the echo cancellation corrections at S1020 may accept, as an input, known background or other noise, as described with respect to the echo cancellation engine 140 of FIG. 3, above.

At S1030, sync corrections are applied to the sampled audio signals. In an embodiment, the sync corrections applied at S1030 may include, as an input, the noise-reduced audio output of the echo cancellation step at S1020. Further, S1030 may include, as an input, tracked faces and, optionally, tracked lips, identified and tracked previously. The application of sync corrections at S1030 may include aspects, elements, or processes described with respect to the sync engine 130 of FIG. 2, above, aspects, elements, or processes of another sync correction implementation, or any combination thereof. The sync corrections applied at S1030 may yield, as an output, an audio signal corrected for time-shift.

At S1040, audio-visual separation corrections are applied. The audio-visual separation corrections applied at S1040 may accept, as inputs, the time-shifted audio output from S1030 and the tracked faces, with optional tracked lips, from the captured video. The applied audio-visual separation at S1040 may produce, as outputs, multiple channels of unique human voices, where each human voice channel includes a correlated face tracker, and a subtracted audio channel containing all audio not included in the aforementioned human voice channels.

At S1050, audio-only separation corrections are applied. The applied audio-only separation corrections applied at S1050 may accept, as an input, the subtracted audio channel output at S1040. The audio-only separation correction performed at S1050 may output one or more channels, each including a unique human voice. The audio-only separation corrections applied at S1050 may include aspects, elements, or processes described with respect to the audio-only separation engine 150 of FIG. 4, above, aspects, elements, or processes of other audio-only separation correction implementations, and any combination thereof.

At S1060, automatic speech recognition (ASR) is applied to enhance speech and improve transcription. The ASR techniques applied at S1060 may accept, as inputs, the one or more face-paired human voice channels produced as outputs at S1040. The ASR techniques applied at S1060 may produce, as outputs, transcribed text for each voice channel input. In an embodiment, the ASR techniques applied at S1060 may allow for the generation of text from audio, and may include one or more algorithms configured to pass certain human voice channels while eliminating certain noise channels.

At S1070, a natural language processing (NLP) technique may be applied to parse text inputs. The NLP techniques applied at S1070 may accept, as inputs, the text generated, at S1060 for each voice channel processed at step S1060. In an embodiment, the NLP techniques applied at S1070 may enable the parsing of text into predefined actions, allowing a user to, through a voice command corrected and converted into text, as described above, activate electronic or other devices using the predefined actions. In an embodiment, NLP techniques may be applied to recognized speech to extract user intentions. As an example of the functionality of the application of NLP techniques at S1070, a user may issue a voice command to request an open window, a request which may be corrected and converted to text as described above, identified to have issued from the particular user, determined to be in reference to the window nearest the user, and applied to allow for the opening of the window.

It may be noted that steps S1050 and S1060 may occur in any order, including simultaneously, without loss of generality or departure from the scope of the disclosure. However, as S1070 may include, as input, the output of S1060, S1070 may not precede S1060. Further, in certain embodiments, S1060 and S1070 are optional.

Figure 11:
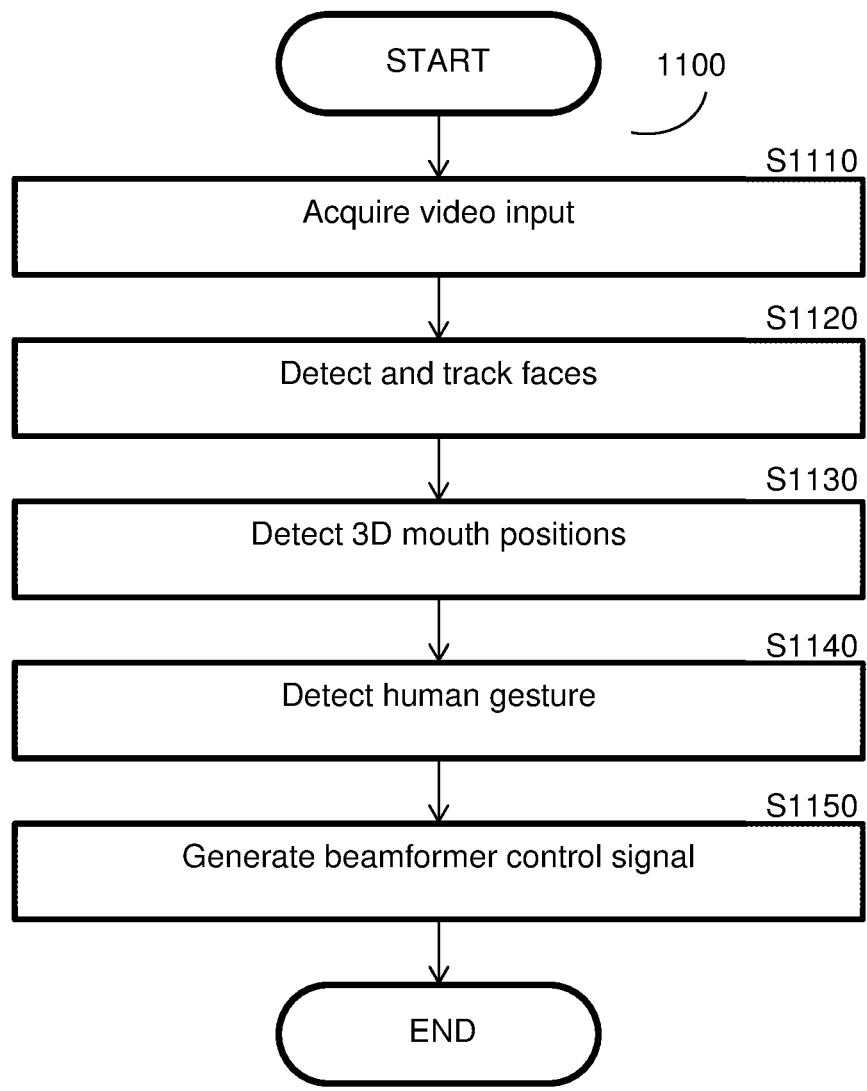
FIG. 11 is a flowchart depicting a process for generating a beamformer control signal according to an embodiment.

FIG. 11 is an example flowchart 1100 depicting a process for generating a beamformer control signal according to an embodiment. At S1110, video input is acquired. Video input may be acquired from one or more cameras 120. The acquired video input may include video depicting one or more sound sources including, without limitation, human speakers. The acquired video input may be live, where the video input is acquired as it is captured by a camera 120, slightly delayed, as with a buffered or moderated live broadcast, or delayed at length, as with a previously-recorded video stored in a medium, as discussed above.

At S1120, faces may be detected and tracked. Faces may be detected using facial recognition methods such as, as an example and without limitation, landmark analysis, whereby facial features, such as noses, ears, and eyes, are detected and mapped, generating a depiction of a face, and other, like, techniques. Faces may be tracked by assigning one or more markers to a facial landmark, such as the eyes or nose, and tracking the movement of the marker as the video progresses, by other, like, techniques, and by any combination thereof. In an embodiment, multiple faces may be detected and tracked simultaneously. Faces may be detected and tracked for video input including, without limitation, live video, slight-delay video, or recorded video. In an embodiment, lips may be tracked as well as, or instead of, faces, using methods similar or identical to those described above.

At S1130, three-dimensional mouth positions are detected. Three-dimensional mouth positions may be detected by isolating mouth regions in the faces detected at S1120 and assigning one or more markers to various areas of the mouth such as, as examples and without limitation, the top and bottom edges of each of the upper and lower lips, the corners of the mouth, various midpoints calculated algorithmically or by estimate, other, like, areas, and any combination thereof. Three-dimensional mouth positions may be tracked by observing the motion of the assigned markers over the course of a video. Where three-dimensional mouth position points are detected using the techniques described, one or more algorithms may accurately estimate the position of the detected mouth, relative to one or more microphones, using the data acquired in steps S1130 and S1120.

In an embodiment, three-dimensional mouth positions may be detected by extracting the human face size or distance between the eyes, for the face or faces detected and tracked at S1120, above. The position of the mouth in the face or faces detected and tracked at S1120, above, the known microphone 110 position or positions, and intrinsic properties of the camera including, without limitation, focal length, optical center, distortion parameter, and other, like properties, may be applied to calculate the position of the mouth or other sound source relative to the microphone or microphones 110.

At S1140, human gestures are detected. Human gestures may be detected in the faces detected and tracked at S1120, in the video input acquired at S1110, in other, like, sources, or in any combination thereof. Human gestures may include nods, shrugs, facial expressions, pointing, other facial or body movements, and any combination thereof. Human gestures may be detected by techniques including, without limitation, identification of specific patterns in detected three-dimensional face or body positions, other, like, techniques, and any combination thereof. Three-dimensional face or body positions may be acquired by, as at S1130, assigning unique tracking tokens or other identifiers to a human's identifiable features, where such identifiable features include, as examples and without limitation, eyes, mouths, elbows, hands, other, like, identifiable features, and any combination thereof.

At S1150, a beamformer control signal is generated based on the detected mouth position, gesture, or both. That is, the control signal directs the beamformer in the direction of the detected mouth, gesture, or both. As sounds emitted from a single source will reach microphones 110 disposed in different positions at different times, this time difference can be used to locate the position of the sound source. The accuracy of the sound source position estimate may be enhanced by directing the beamformer (hence the microphones 110) at the direction determined by the control signal.

It should be noted that as a sound source may move during the course of emitting a sound, or between sound emissions, continuous analysis of microphone 110, time differences and three-dimensional mouth positions may allow for accurate estimation of the position of a moving source. By combining the acquired audio input, including microphone 110 time differences and the detected three-dimensional mouth positions, a beamformer for each mouth position may be generated, enhancing sounds known to emanate from the position of the mouth or other source, thereby allowing for improved distinction between the voices of multiple speakers and the elimination or reduction of background noise.

Figure 12:
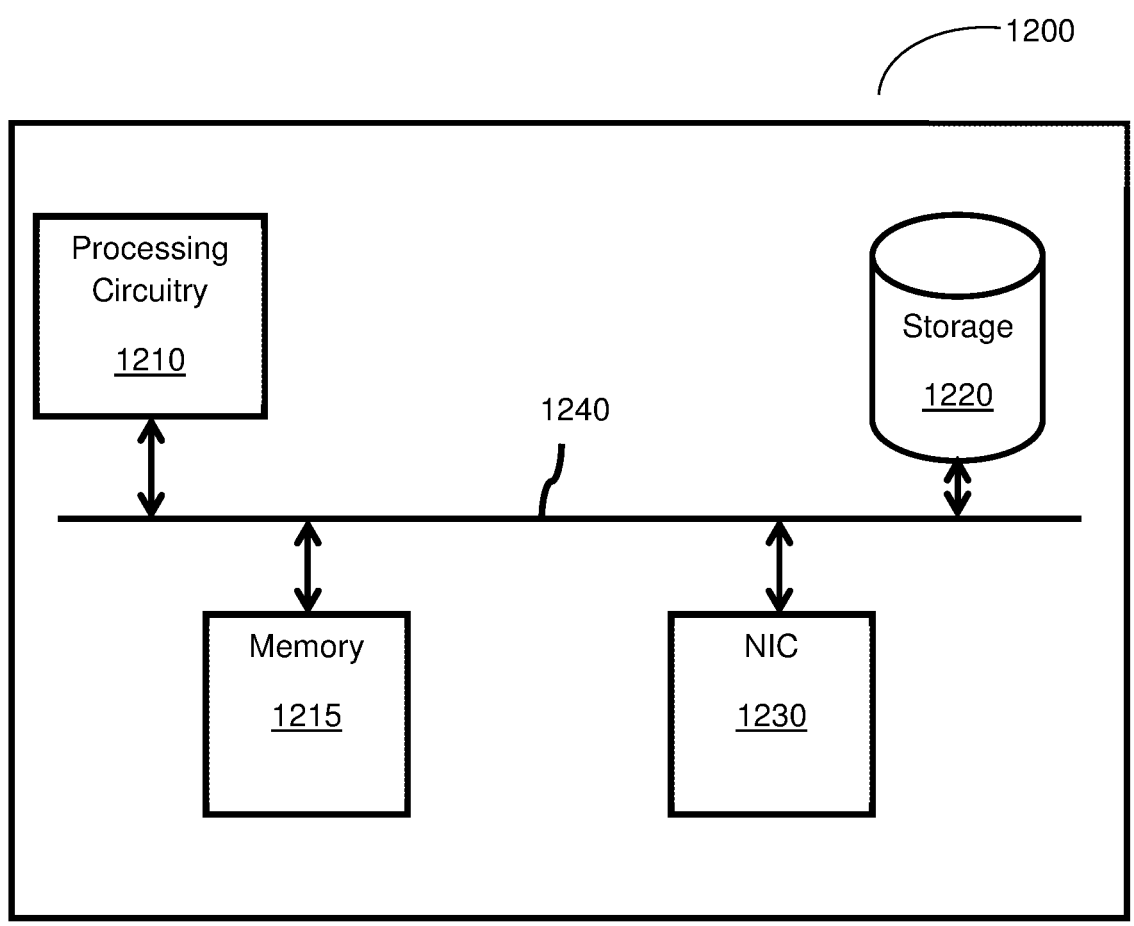
FIG. 12 is a block diagram of a system utilized to execute the processes and systems described herein, according to an embodiment.

FIG. 12 is an example block diagram of a system utilized to execute the processes and systems described herein, according to an embodiment. The system 1200 includes a processing circuitry 1210 coupled to a memory 1215, a storage 1220, and a network interface 1230. In an embodiment, the components of the system 1200 may be communicatively connected via a bus 1240.

The processing circuitry 1210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 1215 may be volatile (e.g., RAM, etc.), non-volatile (e.g., ROM, flash memory, etc.), or a combination thereof. In one configuration, computer readable instructions to implement one or more embodiments disclosed herein may be stored in the storage 1220.

In another embodiment, the memory 1215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 1210 to perform the various processes described herein.

The storage 1220 may be magnetic storage, optical storage, and the like, and may be realized, for example, as flash memory or other memory technology, CD-ROM, Digital Versatile Disks (DVDs), or any other medium which can be used to store the desired information.

The network interface 1230 allows the system 1200 to communicate with a data source.

It should be understood that the embodiments described herein are not limited to the specific architecture illustrated in FIG. 12, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for audio-visual multi-speaker speech separation, comprising:
   receiving audio signals captured by at least one microphone;
   receiving video signals captured by at least one camera; and
   providing the audio signals and the video signals to a sync engine configured to:
      derive an audio vector from the audio signals and a video vector from the video signals;
      compute a correlation score by shifting either the audio vector or the video vector and compare the shifted vector against a remaining unshifted vector, wherein the correlation score is based on a number of shifts needed to achieve a match; and
      extract facial characteristics of each speaker from multi-speaker synchronized video signals to provide for mutual influence between audio and video to assist in an audio-visual separation;
      apply audio-visual separation on the received audio signals and the video signals by simultaneously analyzing each of multi-speaker synchronized video signals to provide isolation of sounds from the at least one microphone and the at least one camera based on the correlation score by generating an audio output comprising any of:
         a time-shifted variant of the audio signal based on a number of shifts of the audio signal assigned a highest correlation score;
         a time-shifted variant of the video signal based on a number of shifts of the video signal assigned a highest correlation score; and
         the audio signal time-shifted to synchronize with lip movements in the video signal,
      wherein the audio-visual separation is based, in part, on angle positions of at least one speaker relative to the at least one camera.

2. The method of claim 1, further comprising:
   determining, based on gesture recognition, the intention of a speaker to talk.

3. The method of claim 1, further comprising:
   separating the audio signals into multiple distinct voice and noise channels by their contents.

4. The method of claim 1, further comprising performing at least one of:
   applying echo cancellation on the received audio signals; or
   applying synchronization correction on the received audio signals.

5. The method of claim 1, wherein the at least one microphone includes an array of microphones, and wherein the array of microphones is directed to a specific position in the space based on the angle positions.

6. The method of claim 5, further comprising:
   generating a beamformer control signal to control the aiming direction of the array of microphones in the space based on a facial recognition.

7. The method of claim 5, further comprising:
   applying speech recognition on each separated audio channel.

8. The method of claim 7, further comprising:
   applying natural language processing on recognized speech to extract user intention.

9. The method of claim 8, further comprising:
   personalizing voice commands based on the separated voice channels.

10. The method of claim 1, wherein applying audio-visual separation further comprises:
    detecting faces appearing in the captured video signals;
    tracking each detected face; and
    determining angle positions based on each tracked face, wherein the current speaker is determined by a tracked face.

11. The method of claim 10, wherein determining angle positions includes analysis of information on at least: image attributes captured by the at least one camera, intrinsic parameters of the at least one camera, and factors describing the angle and position of the sound source.

12. The method of claim 11, wherein the image attributes further include:
    image coordinates, wherein the image coordinates define at least a position of a set of lips in the captured video, and undistorted image coordinates, wherein the undistorted image coordinates define a position of a set of lips in an undistorted image.

13. The method of claim 11, further comprising:
    converting the image coordinates into world coordinates; and
    determining a camera mouth angle position in a tracked face relative to the at least one camera based on the world coordinates.

14. The method of claim 11, further comprising:
    determining a microphone camera angle position of the at least one camera relative to the at least one microphone; and
    determining a mouth angle position in a tracked face relative to the at least one microphone based on the camera mouth angle position and the microphone camera angle position.

15. A non-transitory computer readable medium having stored thereon instructions for causing a processing circuitry to execute a process for audio-visual multi-speaker speech separation, the process comprising:
    receiving audio signals captured by at least one microphone;
    receiving video signals captured by at least one camera; and
    providing the audio signals and the video signals to a sync engine configured to:
       derive an audio vector from the audio signals and the video vector from the video signals;
       compute a correlation score by shifting either the audio vector or a video vector and compare the shifted vector against a remaining unshifted vector, wherein the correlation score is based on a number of shifts needed to achieve a match; and
       extract facial characteristics of each speaker from multi-speaker synchronized video signals provide for mutual influence between audio and video to assist in an audio-visual separation;
       apply audio-visual separation on the received audio signals and the video signals by simultaneously analyzing each of multi-speaker synchronized video signals to provide isolation of sounds from the at least one microphone and the at least one camera based on the correlation score by generating an audio output comprising any of:
          a time-shifted variant of the audio signal based on a number of shifts of the audio signal assigned a highest correlation score;
          a time-shifted variant of the video signal based on a number of shifts of the video signal assigned a highest correlation score; and the audio signal time-shifted to synchronize with lip movements in the video signal,
wherein the audio-visual separation is based, in part, on angle positions of at least one speaker relative to the at least one camera.

16. A system for audio-visual multi-speaker speech separation, comprising:
a processing circuitry; and
a memory, the memory containing instructions that, when executed by the processing circuitry, configure the system to:
receive audio signals captured by at least one microphone;
receive video signals captured by at least one camera; and
provide the audio signals and the video signals to a sync engine configured to:
derive an audio vector from the audio signals and a video vector from the video signals;
compute a correlation score by shifting either the audio vector or the video vector and compare the shifted vector against a remaining unshifted vector, wherein the correlation score is based on a number of shifts needed to achieve a match; and
extract facial characteristics of each speaker from multi-speaker synchronized video signals to provide for mutual influence between audio and video to assist in an audio-visual separation;
apply audio-visual separation on the received audio signals and the video signals by simultaneously analyzing each of multi-speaker synchronized video signals to provide isolation of sounds from the at least one microphone and the at least one camera based on the correlation score by generating an audio output comprising any of:
a time-shifted variant of the audio signal based on a number of shifts of the audio signal assigned a highest correlation score;
a time-shifted variant of the video signal based on a number of shifts of the video signal assigned a highest correlation score; and
the audio signal time-shifted to synchronize with lip movements in the video signal,
wherein the audio-visual separation is based, in part, on angle positions of at least one speaker relative to the at least one camera.

17. The system of claim 16, wherein the system is further configured to:
determine, based on gesture recognition, the intention of a speaker to talk.

18. The system of claim 16, wherein the system is further configured to:
separate the audio signals into multiple distinct voice and noise channels by their contents.

19. The system of claim 16, wherein the system is further configured to apply at least one of:
echo cancellation on the received audio signals; or
synchronization correction on the received audio signals.

20. The system of claim 16, wherein the at least one microphone includes an array of microphones, and wherein the array of microphones is directed to a specific position in the space based on the angle positions.

21. The system of claim 20, wherein the system is further configured to:
generate a beamformer control signal to control the aiming direction of the array of microphones in the space based on a facial recognition.

22. The system of claim 20, wherein the system is further configured to:
apply speech recognition on each separated audio channel.

23. The system of claim 22, wherein the system is further configured to:
apply natural language processing on recognized speech to extract user intention.

24. The system of claim 23, wherein the system is further configured to:
personalize voice commands based on the separated voice channels.

25. The system of claim 16, wherein the system is further configured to:
detect faces appearing in the received video signals;
track each detected face; and
determine angle positions based on each tracked face, wherein the current speaker is determined by a tracked face.

26. The system of claim 25, wherein determining angle positions includes analysis of information on at least: image attributes captured by the at least one camera, intrinsic parameters of the at least one camera, and factors describing the angle and position of the sound source.

27. The system of claim 26, wherein the image attributes further include:
image coordinates, wherein the image coordinates define at least a position of a set of lips in the captured video, and undistorted image coordinates, wherein the undistorted image coordinates define a position of a set of lips in an undistorted image.

28. The system of claim 26, wherein the system is further configured to:
convert the image coordinates into world coordinates; and
determine a camera mouth angle position in a tracked face relative to the at least one camera based on the world coordinates.

29. The system of claim 26, wherein the system is further configured to:
determine a microphone camera angle position of the at least one camera relative to the at least one microphone; and
determine a mouth angle position in a tracked face relative to the at least one microphone based on the camera mouth angle position and the microphone camera angle position.

* * * * *